Figure 1:
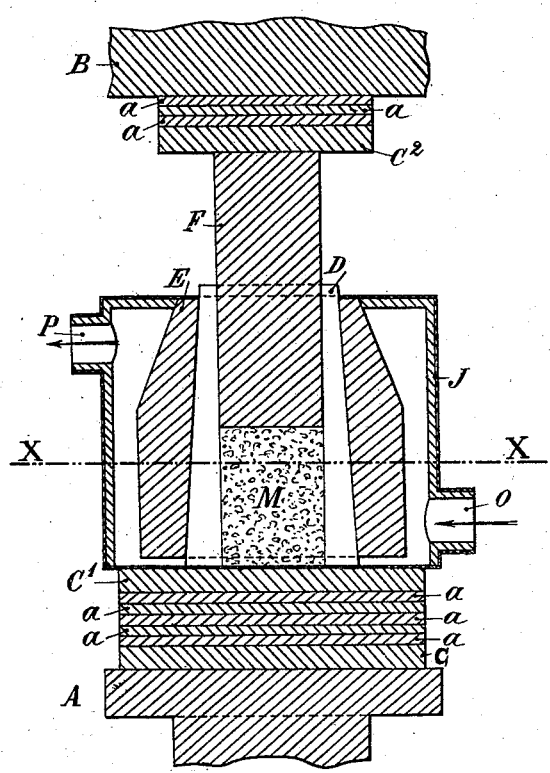

No. 712,807. Patented Nov. 4, 1902.
V. KARAVODINE.
PROCESS OF TREATING MINERAL SUBSTANCES BY HEAT AND PRESSURE.
(Application filed Mar. 27, 1900.)
(No Model.)

Witnesses
W. R. Kennedy
A. M. E. Kennedy

Inventor
Victor Karavodine
B. P. T. Dodge Atty.

UNITED STATES PATENT OFFICE.

VICTOR KARAVODINE, OF PARIS, FRANCE.

PROCESS OF TREATING MINERAL SUBSTANCES BY HEAT AND PRESSURE.

SPECIFICATION forming part of Letters Patent No. 712,807, dated November 4, 1902.

Application filed March 27, 1900. Serial No. 10,380. (No specimens.)

*To all whom it may concern:*

Be it known that I, VICTOR KARAVODINE, engineer, a subject of the Emperor of Russia, residing in Paris, in the Republic of France, (whose postal address is 28 Rue Lacordaire, Paris,) have invented a certain new and useful Process of Treating Mineral Substances by Heat and Pressure, of which the following is a specification.

My invention has for its object an improved process for converting into solid masses substances which contain water chemically combined—such, for instance, as the water of constitution or crystallization. This method consists in subjecting the said substances simultaneously to a high temperature and a strong compression in such a way that the water is expelled by the high temperature, while the compression agglomerates the molecules and causes them to adhere together. The water being thus expelled, solid substances result having the same qualities—as, for instance, the hydrates of aluminium ($Al_2O_3 3H_2O$) or of silicon, ($SiO_2 2H_2O$,) the alkaline earthy hydrates, such as lime, ($CaH_2O_2$,) magnesia, ($MgH_2O$,) iron, ($2Fe_2O_3 3H_2O$,) or copper, ($CuH_2O$,) and their analogues, the latter being taken separately or intermixed or mixed with fibrous and pulverulent substances. All like combinations which contain the water of constitution and of crystallization (but not merely hygroscopic water) being subjected to a hot compression—that is to say, a compression during which the body subjected to the pressure is heated—yield masses so hard and so solid that it has hitherto been impossible to obtain similar substances by means of the saturation of fibrous bodies with salts and reagents producing the hereinbefore-mentioned hydrates in the pores of the fibrous body. The insufficient solidity of masses obtained by means of the second-named process arises from the fact that the hydrates in drying greatly diminish in volume, (from ten to twenty times,) being converted into anhydrids or into hydrates with a small quantity of water, and this is why they assume a sandy appearance, leaving in the mass large pores, and are deficient in solidity. On the contrary, in the method which I propose the hydrates (or in general the compounds containing water of constitution or crystallization) and a mixture of them with pulverized and fibrous substances are placed in a metal mold and subjected to hot compression, the mass being compressed by means of a hydraulic press and the metallic mold being heated at the same time by any suitable means. Owing to this hot compression the water of constitution or of crystallization (or both together) evaporates from the hydrates and escapes through the interstices of the mold, and the molecules of the anhydrids or of the hydrates with a small quantity of water are united owing to the pressure in proportion as the water escapes and adhere together at the very instant when they are freed from the water, and this is the reason why the volume of the mass becomes much smaller than before the heating and obtains a much greater solidity. For instance, if I take one kilogram of asbestos and mix it with one kilogram of silicate of soda, ($K_2Si_4O_9$,) at 36° Baumé and add to this mixture .36 of alum, preferably ammoniacal alum, ($NH_4)_2Al_2SO_4 24(H_2O)$,) I obtain a gelatinous mixture in which the asbestos fibers are surrounded with silicate of aluminium $[(Al_2O_3)_m(SiO_2)_n(H_2O)_{12}]$. Then this paste, which is preferably freed from the foreign salts by washing and from the superfluous water which it contains by means of a slight pressure, is subjected to a hot compression in a metal mold. The mold must be heated to from 250° to 400° centigrade at the same time as the substances which are therein contained are compressed. There is thus finally obtained a very hard elastic and easily-polished mass which is a bad conductor of electricity, especially if it be saturated with boiled oil or colophony melted with one to three parts of a suitable resin. The less asbestos there is in this paste in proportion to the hydrates the harder will be the mass and the less elastic, and it will have the appearance of stone.

Instead of silicates of aluminium hydrate of silicon may also be obtained by pressing it hot in the manner just described. With this object hydrate of silicon is first precipitated—for instance, in a mixture of asbestos and silicate of soda in the proportions of one part of asbestos and one part of silicate of soda—by chemical means—for instance, by the use of carbonic acid. Hydrate of aluminium may also be obtained by mixing the asbestos with a saturated solution of alum and then treating this paste by means of ammonia, ($NH_4$.) The operation may also be performed by adding to the mixture of asbestos and silicate of soda a solution of any suitable alkaline earthy salt—for instance, calcium or magnesium in the form of a chloric compound, ($CaCl_2$—$MgCl_2$,) and there will be obtained in the fibers of the asbestos hydrated silicate of calcium ($SiCaO_3$+aqua) or of magnesium, ($SiMg_3$+aqua). If in this case instead of silicate of soda a suitable solution of an aluminium salt be taken, there will be obtained hydrate of aluminium of the alkaline earthy metal—for instance, ($Al_2CaO_4$+aqua or $Al_2MgO_4$+aqua.) Asbestos with hydrate of iron, or wolfram, ($H_2WO_4$+aqua,) or copper, or the like yield under the same conditions very hard and very solid masses. The hydrate of silicate of calcium or magnesium or the aluminates of these metals mixed with caustic lime ($CaHO_2$) or with magnesia ($MgHO_2$) or without these latter also yield a very solid whitish mass. Instead of asbestos another suitable material—such, for instance, as graphite—may be employed, and the mass obtained (always by means of hot compression) will be of great solidity and may be employed for the manufacture of crucibles, pencils, crayons, carbons for electric lamps, and the like.

The hydrates in question may be prepared separately and freed from superfluous water by means of a light pressure and mixed with fibrous and pulverized substances in the proportion of one part of such substances and one part of hydrate. These hydrates may also be preliminarily dried at a low temperature of from 30° to 50° centigrade and subjected to a hot compression alone or with fibrous and pulverized substances and damp or dry. The mixtures will then in all cases have the same solidity. The mass composed of gelatinous hydrates may also be preliminarily moistened and dried at a temperature not exceeding 50° centigrade and be subjected, damp or dry, to a hot compression. It is possible to obtain, for instance, an asbestos mass by mixing it with natural hydrates—such, for instance, as tripoli or silicious fossil meal (hydrate of silicon) or with clay—which mass by means of hot compression also becomes resistant and solid. These masses become still more solid if to the tripoli there be added one to three per cent. of caustic lime (KOH) and to the clay a like quantity of some suitable acid.

In all the masses of which mention has been hereinbefore made the quantity of the hydrates and of the fibrous and pulverized bodies may be modified indefinitely, because even a small quantity of a suitable hydrate—say two to five per cent.—mixed with the said bodies yields by means of hot compression a solid product, and, vice versa, by diminishing simultaneously the quantity of the fibrous and pulverized substances a mass will be obtained in which these substances are entirely absent, because hydrates alone similarly to all the other chemical compounds containing water of constitution and crystallization, or mixed with one another yield by means of hot compression very hard masses in the form of minerals. In order that these minerals shall not adhere to the walls of the mold, they may after being compressed without being heated be placed in another larger mold and the interstices filled with graphite or talc and then subjected to a hot compression. Under these circumstances the hydrates are compressed by the pressure of soft bodies (graphite or talc.)

Figure 2:
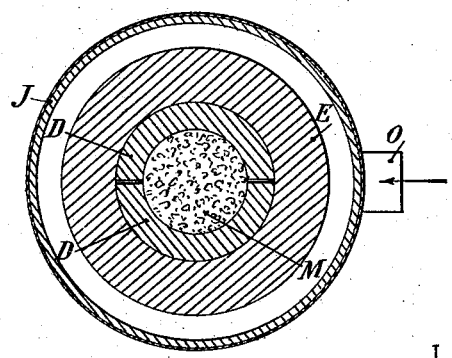

Referring to the accompanying drawings, showing an example of an apparatus intended to carry out my invention, Figure 1 is a vertical section through the apparatus. Fig. 2 is a horizontal section on the line $x$ $x$ of Fig. 1.

A and B are the upper and under plates of a hydraulic press.

$a$ represents sheets of asbestos board for preventing heat from being transmitted to the plates, and C, C', and $C^2$ are metal plates interposed between the plates of the press and the mold in which the substances are heated and compressed.

The substance M to be compressed and heated is inclosed in a mold D, formed of two semicircular pieces, as shown in Fig. 2. The external surface of the steel mold D is slightly tapered, and it is surrounded by the steel ring E, having its internal surface also slightly tapered.

F represents a compressing-piston, J a metallic casing lined internally with asbestos, as an insulating material which also resists a high temperature, and O and P represent the admission and discharge pipes, respectively, for the hot gases coming from a suitable furnace, while instead of hot gases for certain material molten lead may be employed.

My process is applied in the following manner: The substance to be compressed is introduced into the matrix D, and the piston F is inserted in the upper end of the mold, and after the ring E and the casing J have been fitted on the two plates of the press are approached in such a way as to hold the apparatus. Then the hot gases are caused to circulate around the ring E at the same time that pressure is applied by means of the press. Account may be taken of the temperature by observing the color of the ring E, which is of steel and which assumes tints corresponding to the degrees of temperature. As the piston is not hermetically fitted in the matrix D and also the two parts of the matrix D are not drawn together in an absolutely tight manner, the water expelled by the heat is discharged through the interstices, while at the same time the molecules are agglomerated by the compression.

As regards the degree of temperature necessary for heating the mold during the compression it must be noted that the higher the temperature the harder will be the mass, except of course in the cases where bodies which decompose at too high a temperature—such, for instance, as paper-pulp, which cannot endure a temperature higher than 150° to 200° centigrade—are mixed with the hydrates or any of the other chemical compounds containing water of constitution or of crystallization. Similarly, artificial malachite can only endure 150° to 200° centigrade, as it decomposes at a higher temperature. As regards the force of the pressure the following fact must be observed. The greater the pressure the greater the hardness and the less the elasticity of the mass obtained. A good result will be obtained by a pressure of seven hundred kilograms per square centimeter.

In order to obtain sheets or plates, the mass may be passed between hot cylinders, and in order to facilitate the operation the said mass may be inserted between two metal plates and the whole passed between hot cylinders, and in order that the mass shall not adhere to the said plates they may be powdered with talc or covered with paper or asbestos paper.

I declare that what I claim is—

1. The process of treating mineral substances insoluble in water and containing water chemically combined to produce refractory solid compact masses, which process consists in subjecting said substances simultaneously to a temperature of from 250° to 400° centigrade, and to a high pressure exceeding one hundred kilograms per square centimeter, thereby expelling by heat the chemically-combined water, and agglomerating the molecules by pressure, substantially as described.

2. The process of treating mineral substances insoluble in water and containing water chemically combined to produce solid, compact masses, which process consists in mixing fibrous substances with the said mineral substances, and subjecting the combined mass simultaneously to a temperature of from 250° to 400° centigrade and to a high pressure exceeding one hundred kilograms per square centimeter, substantially as described.

3. The process of treating mineral substances insoluble in water and containing water chemically combined to produce solid, compact masses, which process consists in mixing pulverulent substances with said chemical substances, and then subjecting the combined mass to a temperature of from 250° to 400° centigrade and to a high pressure exceeding one hundred kilograms per square centimeter, substantially as described.

In witness whereof I have hereunto signed my name, this 14th day of March, 1900, in the presence of two subscribing witnesses.

VICTOR KARAVODINE.

Witnesses:
 AUGUSTE FOWINOL,
 VICTOR DE MARENDOWSKI.